United States Patent
Hilgers et al.

(10) Patent No.: US 6,640,692 B1
(45) Date of Patent: Nov. 4, 2003

(54) KITCHEN MACHINE WITH A STIRRER VESSEL

(75) Inventors: Stefan Hilgers, Essen (DE); Klaus-Martin Weber, Wuppertal (DE); Stefan Dörner, Solingen (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 0 days.

(21) Appl. No.: 10/257,496

(22) PCT Filed: Apr. 4, 2001

(86) PCT No.: PCT/EP01/03803

§ 371 (c)(1),
(2), (4) Date: Feb. 24, 2003

(87) PCT Pub. No.: WO01/78569

PCT Pub. Date: Oct. 25, 2001

(30) Foreign Application Priority Data

Apr. 18, 2000 (DE) .......................................... 100 19 126

(51) Int. Cl.⁷ .............................. A23L 1/00; A21B 1/00; A47J 29/00; A47J 43/04; A47J 43/07
(52) U.S. Cl. ......................... 99/348; 99/510; 366/144; 366/146; 366/314; 366/601
(58) Field of Search .......................... 99/327–333, 337, 99/338, 348, 509–511, 468; 241/37.5, 92, 282.1, 65, 23; 366/206, 144–146, 314, 601, 246–251; 219/441, 448.11, 466.1, 543, 400, 415, 432, 433, 429, 461, 521, 494, 497; 426/523, 519, 243; 338/307; 392/422

(56) References Cited

U.S. PATENT DOCUMENTS

| | | | | |
|---|---|---|---|---|
| 4,779,522 A | * | 10/1988 | Wong ........................... | 99/348 |
| 4,870,896 A | * | 10/1989 | Asahina et al. ................ | 99/348 |
| 5,013,158 A | * | 5/1991 | Tarlow ......................... | 366/251 |
| 5,031,518 A | * | 7/1991 | Bordes ......................... | 99/338 |
| 5,228,381 A | * | 7/1993 | Virgilio et al. ................ | 99/331 |
| 5,363,746 A | * | 11/1994 | Gordon ........................ | 99/328 |
| 5,605,090 A | * | 2/1997 | Mantani et al. ......... | 366/146 X |
| 6,046,438 A | | 4/2000 | Slegt | |

FOREIGN PATENT DOCUMENTS

| | | |
|---|---|---|
| DE | 4414821 | 11/1995 |
| EP | 0322836 | 7/1989 |
| FR | 2737380 | 1/1997 |

\* cited by examiner

Primary Examiner—Timothy F. Simone
(74) Attorney, Agent, or Firm—Martin A. Farber

(57) ABSTRACT

A food processor (1) with a mixing vessel (12) and a drive (21) for an agitator (11) in the mixing vessel (12), the mixing vessel (12) being heatable in its lower region and having on a bottom a dome (24) which has a securing mount for the agitator, wherein a resistance heating element (10) with printed conductors (23) applied to a dielectric (22) is fitted on a base (16) of the mixing vessel (12), the heating element (10) having a central recess (25) which is adapted to the dome (24), said heating element (10) being generally circular and disk-shaped.

12 Claims, 6 Drawing Sheets

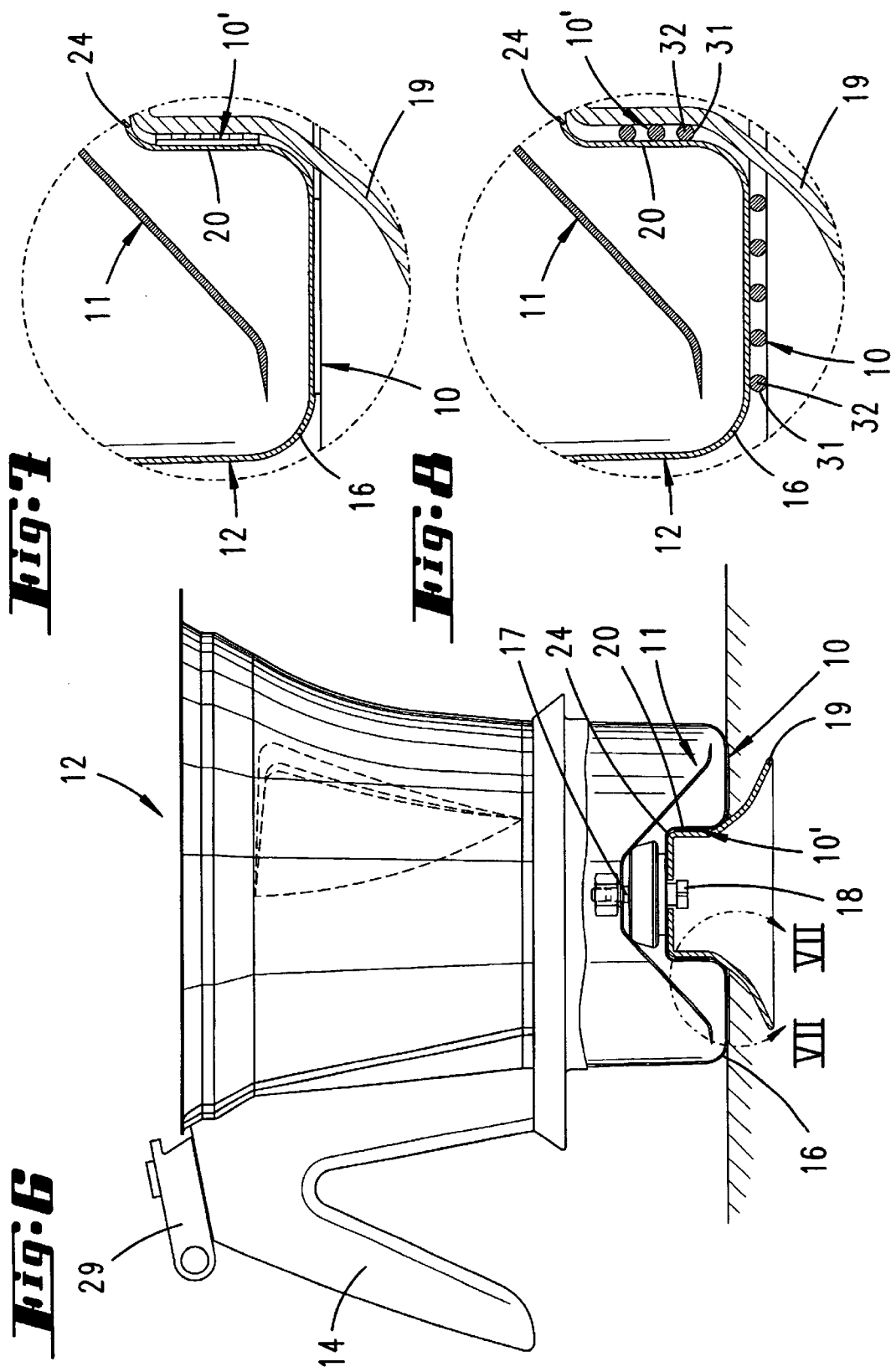

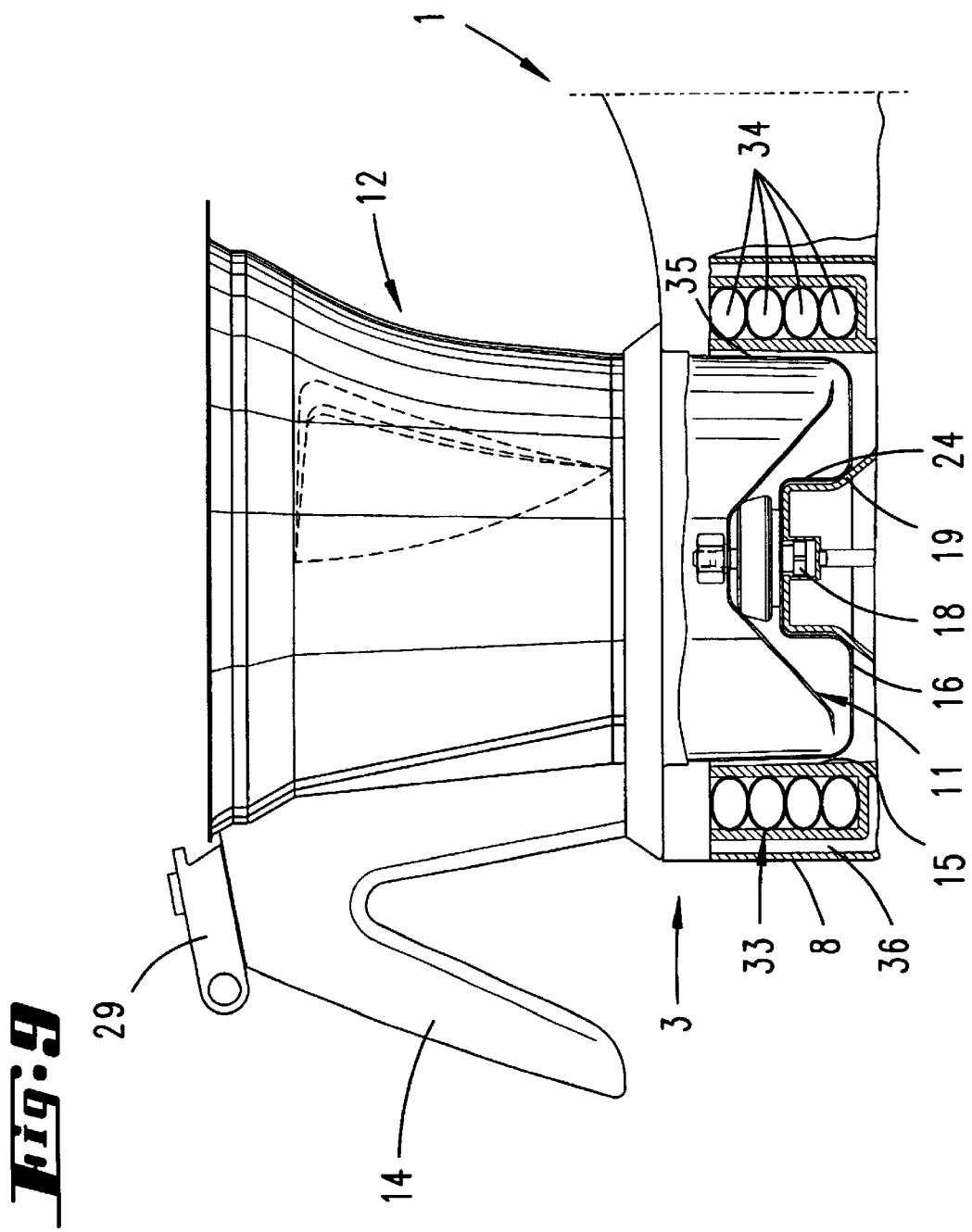

KITCHEN MACHINE WITH A STIRRER VESSEL

FIELD AND BACKGROUND OF THE INVENTION

The invention relates in first instance to a food processor with a mixing vessel and a drive for an agitator in the mixing vessel, the mixing vessel being heatable in its lower region and having on the bottom a dome which has the securing mount for the agitator.

A food processor of this type is known, for example, from DE-A1 44 14 821. The content of this patent application is hereby incorporated in full in the disclosure of the present invention, including for the purpose of incorporating features of this patent application in claims of the present invention. In the case of this known solution, heating up of the mixing vessel and of the food contained therein takes place by means of a resistance heating element which externally encloses the mixing vessel in its lower region and is formed for example as a circular resistance heating wire which is carried by a sleeve clamping the mixing vessel in the mixing-vessel mount.

With regard to the prior art described above, developing a food processor of the type in question in an advantageous way, in particular with regard to improved heat transfer, is seen as a technical problem for the invention to solve.

SUMMARY OF THE INVENTION

This problem is solved in that a resistance heating element with printed conductors applied to a dielectric is fitted on the base of the mixing vessel, the generally circular, disk-shaped heating element having a central recess which is adapted to the dome. As a result of this configuration, the mixing vessel and the food contained in it are heated directly. There are smaller losses in comparison with the known prior art. The heat introduced is transferred directly into the food. Furthermore, by dispensing with large masses for heating, the controllability of the heating system is improved and the heating-up rate is increased. What is more, uniform temperature distribution is made possible by disposing the heating element in a specific way. On account of the increased efficiency, the required electrical power is minimized, whereby the prescribed duty cycles are shortened, with an accompanying increase in the control accuracy. It also proves to be advantageous that the way in which the resistance heating element is disposed and configured according to the invention makes the construction less susceptible to tolerances in comparison with conventional systems, in which known systems an exact engagement between the mixing vessel and the heating is required.

The invention also relates to a food processor with a mixing vessel and a drive for an agitator in the mixing vessel, the mixing vessel being heatable in its lower region and having on the bottom a dome which has the securing mount for the agitator. Here, for the advantageous further development of a food processor of the type in question, it is provided that a resistance heating element with printed conductors enveloped by a dielectric is fitted on the base of the mixing vessel. For example, a tubular heating element which is enveloped by a dielectric and is secured on the base of the mixing vessel may be provided here. Here, too, the food is heated directly, with the advantage of a lower loss, since the heat introduced is transferred directly into the food. What is more, the controllability of the heating system is improved and the heating-up rate is increased.

Independently of the configuration according to the invention of the resistance heating element fitted on the base of the mixing vessel, it is further provided that the printed conductors are secured on the outside of the base of the mixing vessel with the dielectric interposed. In this way, a thick-film heating element or a tubular heating element can be disposed directly on the base of the pot-shaped container or separately on a carrier plate which can be associated with the base of the container. With the heating element disposed on a separate carrier plate, the latter can be both securely fastened to the base of the mixing vessel or disposed removably on the base of the vessel. Furthermore, it is also conceivable to locate the heating element on a mixing-vessel base formed on a removable lower part of the mixing vessel. There is also the possibility of a resistance heating element formed as a thick-film heating element being welded to the mixing container, for example by means of laser welding. Furthermore, for better cleaning, the mixing container may—as mentioned—also be provided with a removable lower part, it being possible here, for example, for the heating element to be molded-in in a lower part produced from plastic. With the resistance heating element formed as a thick-film heating element, it preferably comprises a stainless steel disk (substrate), which is provided on the underside with an insulating layer (dielectric). Applied on top of this, preferably by a screen printing process, are concentric resistance conductors consisting of ceramic pastes, again preferably in concentric circles. The distribution of the conductors over a large surface area produces a very uniform distribution on the heating element. The heat transfer from the heating element to the medium takes place by thermal conduction and is dependent on the thermal conductivity of the conductor, the dielectric and the stainless steel disk. The heat flow in the outer layer of the medium is determined by the size of the heating area, the heat transfer coefficient and the temperature difference between the medium and the stainless steel disk. Burning of critical foods is caused by excessive temperatures at the contact area of the heating. Critical temperatures may occur if the heat transfer coefficient deteriorates significantly. This is often the case with foods which contain starch, which become pasty from temperatures of 70° C. and, owing to a sharp increase in viscosity, lead to a reduction in the heat transfer coefficient. If the heating power is not reduced, this is followed by a drastic rise in temperature at the heating surface on the inner side of the base of the mixing container. Apart from the main heat flow, an increased lateral heat flow in the direction of the disk area forms because of a lack of heat removal. To counteract this disadvantageous effect, a measuring sensor is provided, which while passing through a clearance in the dielectric rests against the outer side of the base. A temperature sensor of this type disposed in the direct vicinity of the conductor allows the increase in temperature to be detected and to be limited by switching off the heating. At the same time, a distance between the measuring sensor and the conductor of 2–8 mm is provided. This configuration has the effect of reducing the risk of burning by continuous monitoring of the temperature rise. In an exemplary configuration of the subject matter of the invention, an NTC element with a resistance of, for example, 10,000 ohms is provided for sensing the temperature, the measuring error caused by the existing contact resistance being negligible. In the case of a configuration of the heating element with a generally circular disk-shaped formation and a central recess which is adapted to the dome, the heat is transferred by thermal conduction to the dome of the mixing vessel, which dome secures the agitator. However, a construction in which the dome has a cylindrical region and a resistance heating element is formed in the cylindrical region of the dome is also conceivable. Said resistance heating element may take the form of a thick-film heating element or a tubular heating element, as described above. What is more, it is provided in an advantageous development of the subject matter of the invention that the heating disposed on the mixing container is electrically connected to the basic appliance via, for example, five contacts, that is a pair of contacts for operating the heating at line voltage, a pair of contacts for measuring the NTC resistance at, for example, 5 volts DC, and a protective-conductor terminal. The contacting undertakes not only the power supply to the heating but also the function of correct container detection. With a container inserted, the contact to the NTC (measuring sensor) is established, the resistance of which must be in a defined range. If this is not the case, switching on of the heating is prevented by the appliance software, to eliminate the possibility of a malfunction caused by incorrect resistance values. The contacting is disposed and constructed for example on the mixing vessel in such a way that cleaning of the mixing vessel in a conventional dishwasher is possible. Before removal of the mixing vessel, the voltage supply of the heating is electrically isolated by a switch, for example when a mixing vessel interlocking mechanism is actuated, and is only reactivated when the mixing vessel is locked.

The invention also relates to a food processor with a mixing vessel and a drive for an agitator in the mixing vessel, the mixing vessel being heatable in its lower region and having on the bottom a dome which has the securing mount for the agitator. Here it is proposed for the advantageous development of the subject matter of the invention that externally shielded microwave radiators are disposed outside the mixing vessel, associated with the bottom region. As a result of this configuration, contactless heating is provided for a food processor of the type in question, which is suitable for chopping up, grinding and pulverizing, beating, mixing, slow cooking, emulsifying and steaming. It proves to be particularly advantageous here that the microwave radiators comprise annular quartz-glass radiators which operate in the medium wave range and are disposed one above the other, so that a broad ring around the mixing vessel is created, with a defined distance from the outer surface of the mixing vessel. In this respect, a plurality of separately activatable quartz-glass radiators are preferably provided, that is again for example four annular quartz-glass radiators. The heating elements formed in this way can consequently be activated together, or else independently of one another, making optimized control possible. In addition, it is proposed that the mixing vessel is provided on the outer side of its lower region with a surface with active radiation absorption, which again for example is formed as a black coating. To provide heat protection from the interior of the appliance, it is provided that the microwave radiators are surrounded by a cooling duct. The latter is, in addition, preferably formed as an air duct with a through-flow.

BRIEF DESCRIPTION OF THE DRAWINGS

The invention is explained in more detail below on the basis of the accompanying drawings, which merely represent several exemplary embodiments and in which:

FIG. 6 shows a representation corresponding to FIG. 2, but relating to a second embodiment of the resistance heating element;

FIG. 7 shows the enlarged region VII in FIG. 6;

FIG. 8 shows a representation of an enlarged detail corresponding to FIG. 7, but relating to a further embodiment of the resistance heating element;

FIG. 9 shows a mixing vessel inserted into the mount of the food processor in a partially sectioned representation with an associated resistance heating element of a further embodiment.

DETAILED DESCRIPTION OF PREFERRED EMBODIMENT

Figure 1:
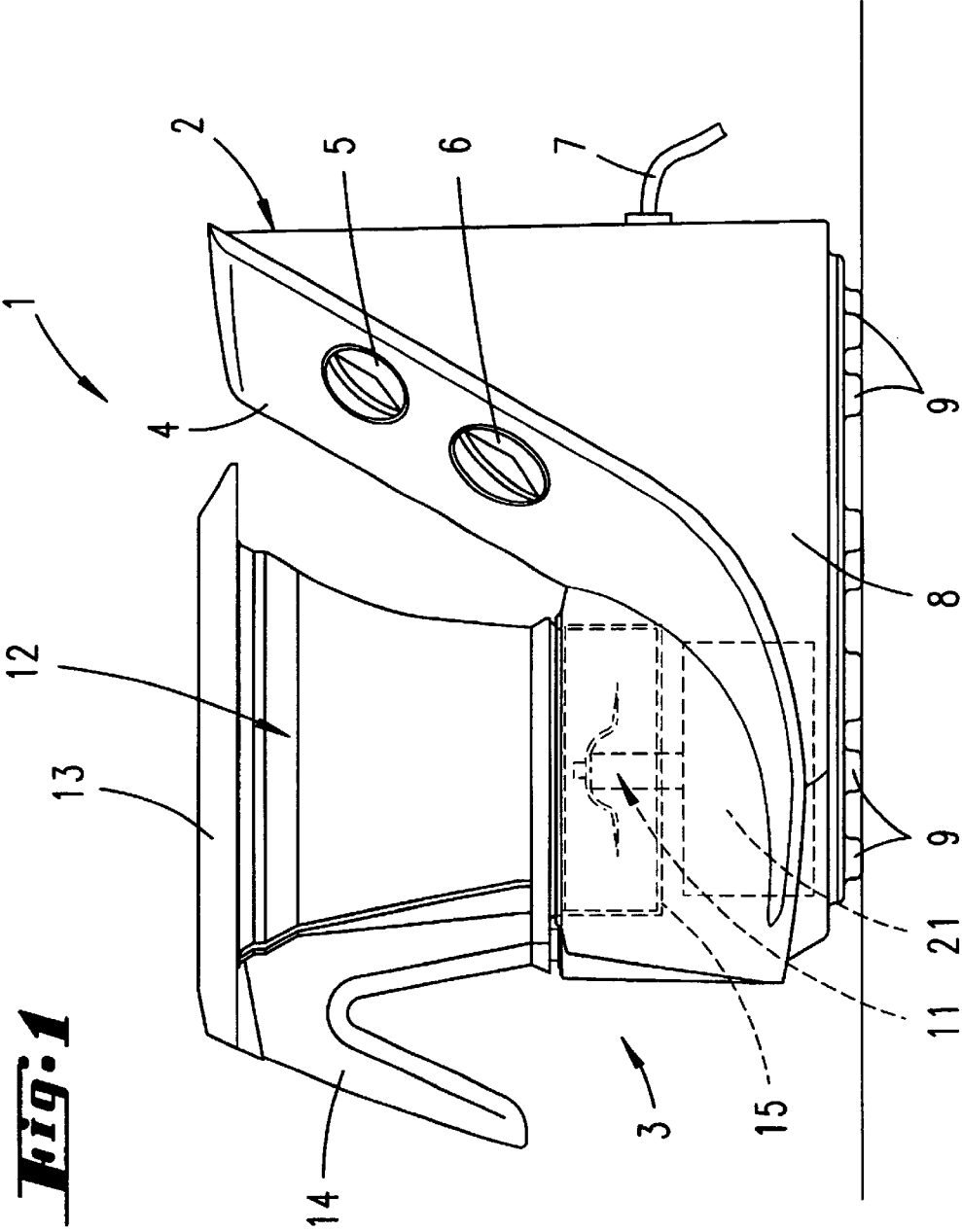
FIG. 1 shows a food processor according to the invention in side view.

Represented and described, in first instance with reference to FIG. 1, is a food processor 1, which is substantially made up of an operating/control region 2 and a mounting/working region 3. The latter is of a pot-shaped form and approximately circular in projection. The operating/control region 2, which has an operator control panel 4 with two rotary switches 5, 6, is formed onto this region. Provided on the rear side of the operating/control region 2 of the food processor 1 is a connection 7 for an electric cable. The housing 8 made up of the two regions 2 and 3 also has supporting feet 9 on the underside.

The rotary switches disposed in the operator control panel 4 serve for regulating the temperature of a resistance heating element 10 (rotary switch 5) and for regulating the rotational speed of an agitator 11 (rotary switch 6).

In the mounting/working region 3, a jug-like mixing vessel 12 can be secured, the upwardly facing opening of which can be closed by means of a removable lid 13. The mixing vessel 12 is also provided on the outside with a handle 14.

For the securing of the mixing vessel 12, a mount 15 is provided in the mounting/working region 3.

Coaxially in relation to the vertical axis of the mixing vessel 12, the latter is provided in the region of the mixing-vessel base 16 with the agitator 11, which is disposed on the mixing-vessel base 16 by means of a securing mount in a ball bearing. The agitator 11 is mounted rotatably in the securing mount on a shaft 17, the shaft 17 having a coupling element 18 at its lower end, which end passes through the mixing-vessel base 16.

After inserting the mixing vessel 12 into the mount 15, the mixing vessel 12 is supported on the base of the mount 15 by a locating foot 19. The locating foot 19 is disposed coaxially in relation to the vertical axis of the mixing vessel 12 in a drawn-in, preferably cylindrical, region 20 of the mixing-vessel base 16. With the mixing vessel 12 inserted into the mount 15, the coupling element 18 engages in an appropriately directed coupling receptacle of an agitator drive 21 driven by an electric motor.

The food processor 1 represented serves for preparing food and provides basic functions for food preparation, that is for example chopping, grinding and pulverizing, beating, mixing, slow cooking, emulsifying and steaming. The heat required for preparation is supplied by means of the resistance heating element 10 mentioned. This takes place according to the invention by the food to be prepared in the mixing vessel 12 being in direct contact with the resistance heating element 10.

Figure 2:
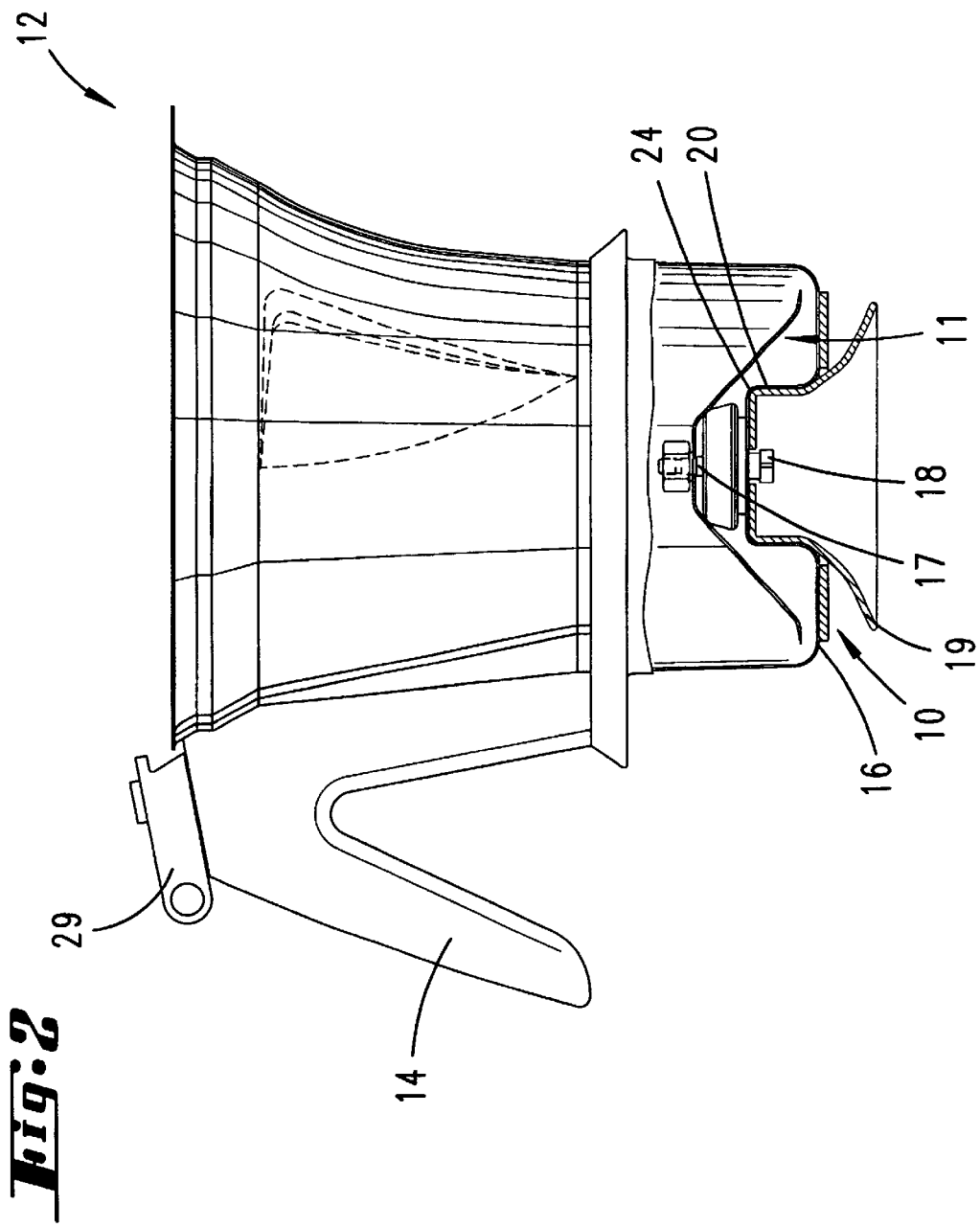
FIG. 2 shows a mixing vessel represented partially in section in the bottom region, with a resistance heating element in a first embodiment.
Figure 3:
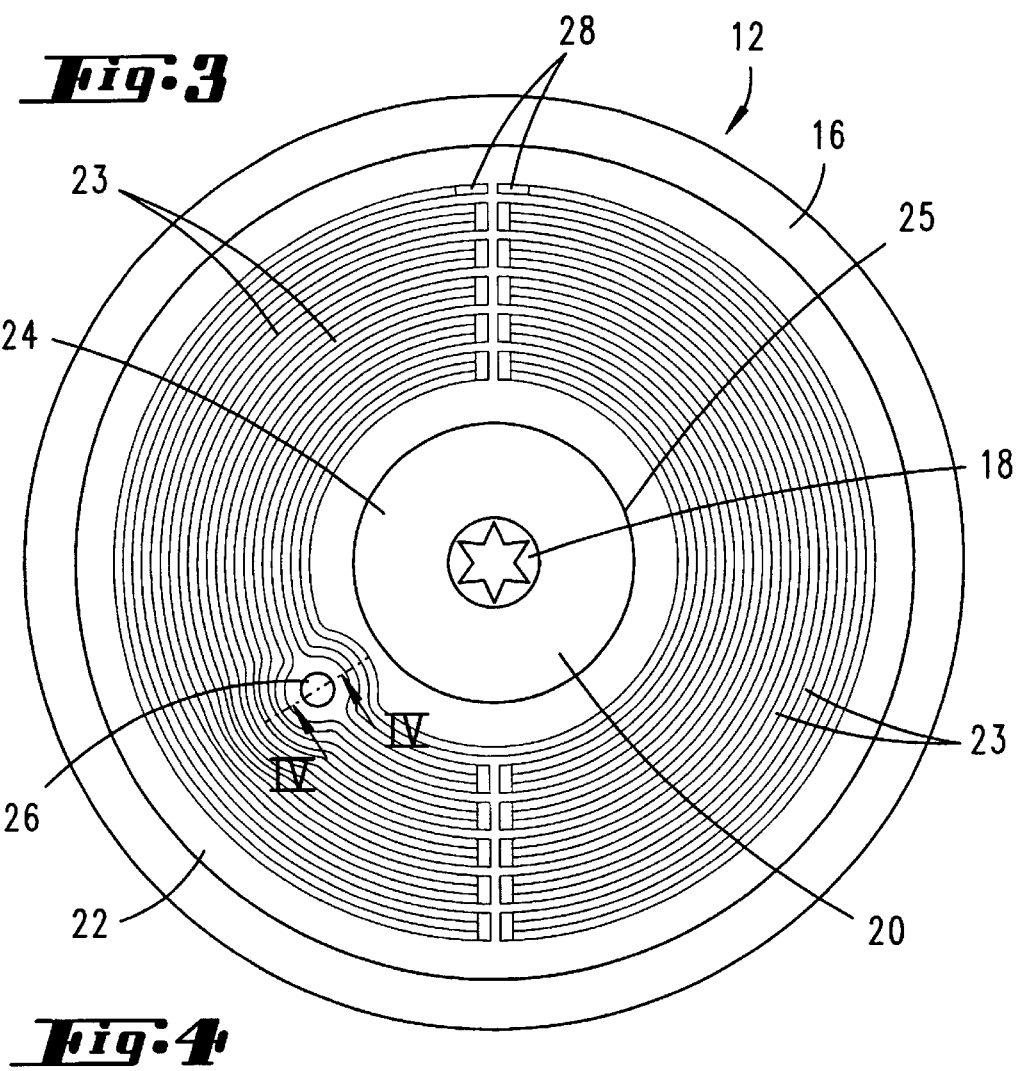
FIG. 3 shows the view from below of the heating vessel looking toward the resistance heating element of the first embodiment.
Figure 4:
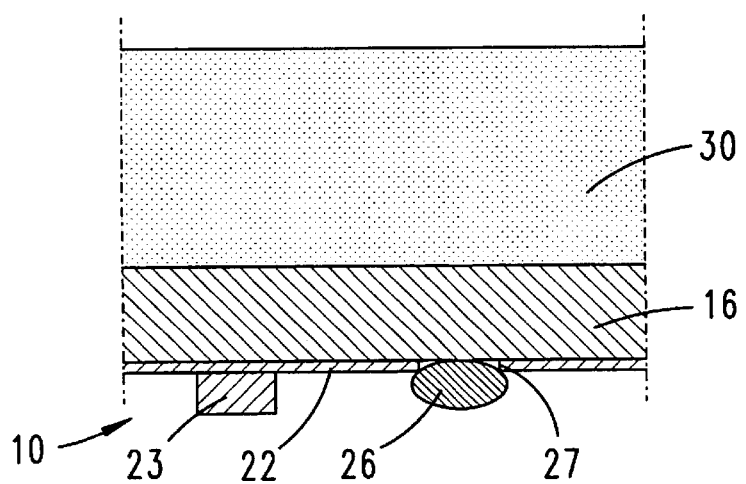
FIG. 4 shows a schematic sectional representation through the region IV—IV in FIG. 3.

According to the invention, provided in first instance as shown in FIGS. 2 to 4 is a resistance heating element 10, which has printed conductors 23 provided on a dielectric 22 forming an insulating layer. The resistance conductors 23 consist of ceramic pastes and are applied to the dielectric by the screen printing process, it being preferred for the conductors 23 to be concentrically disposed as shown in FIG. 3.

Furthermore, the mixing-vessel base 16 is a component part of the resistance heating element 10, for which purpose it is formed as a stainless steel disk (substrate), on the underside of which the dielectric 22 with the conductors 23 are applied.

In the exemplary embodiment represented, the resistance heating element 10 formed in this way is of a generally circular disk-shaped form, with a central recess 25 which is adapted to the dome 24 formed by the drawn-in region 20 of the mixing-vessel base 16.

As a result of this configuration, an annular thick-film heating element is formed on the underside of the mixing vessel 12, this heating element 10 being welded to the mixing vessel 12, for example laser-welded. Alternatively, the mixing vessel 12 may also be provided with a removable lower part, it also being possible in this case for the heating element 10 to be molded-in in a lower part of the mixing vessel made of plastic.

The distribution of the conductors 23 over a large surface area produces a very uniform distribution of heat on the heating element 10. For regulating the temperature, a measuring sensor 26 in the form of an NTC element with a resistance of, for example, 10,000 ohms is provided. This measuring sensor is disposed in the direct vicinity of the conductors 23, whereby the increase in the temperature is detected and is limited by switching off the heating. As a result, the risk of burning is reduced by continuous monitoring of the temperature rise.

The distance between the measuring sensor 26 and the neighboring conductors is about 2–8 mm (cf. FIG. 3).

The measuring sensor 26 is, furthermore, positioned in such a way that, while passing through a clearance 27 in the dielectric, it rests against the outer side of the mixing-vessel base 16.

With the measuring sensor 26 disposed in the direct vicinity of the heating element 10, errors in the controlling accuracy of the heating element 10 are prevented.

The resistance heating element 10 fitted on the mixing vessel 12 is preferably electrically connected to the basic appliance via five contacts, that is via a pair of contacts 28 for operating the heating element 10 at line voltage, a pair of contacts (not represented) for measuring the resistance of the measuring sensor at, preferably, 5 volts DC and a protective-conductor terminal (also not represented).

The contacting undertakes not only the power supply to the heating element 10 but also the function of correct mixing vessel detection. With a mixing vessel 12 inserted, the contact to the measuring sensor 26 is established, the resistance of which must be in a defined range. If this is not the case, switching on of the heating is prevented by the appliance software, to eliminate the possibility of a malfunction caused by incorrect resistance values.

The contacting is disposed and constructed on the mixing vessel 12 in such a way that cleaning of the mixing vessel 12 in a conventional dishwasher is possible. Before removal of the mixing vessel 12, the voltage supply of the heating is electrically isolated by a switch (for example a thumb-actuated, pivotable knob 29 on the handle 14 of the mixing vessel 12) when the mixing vessel interlocking mechanism is actuated, and is only reactivated when the mixing vessel 12 is locked.

Figure 5:
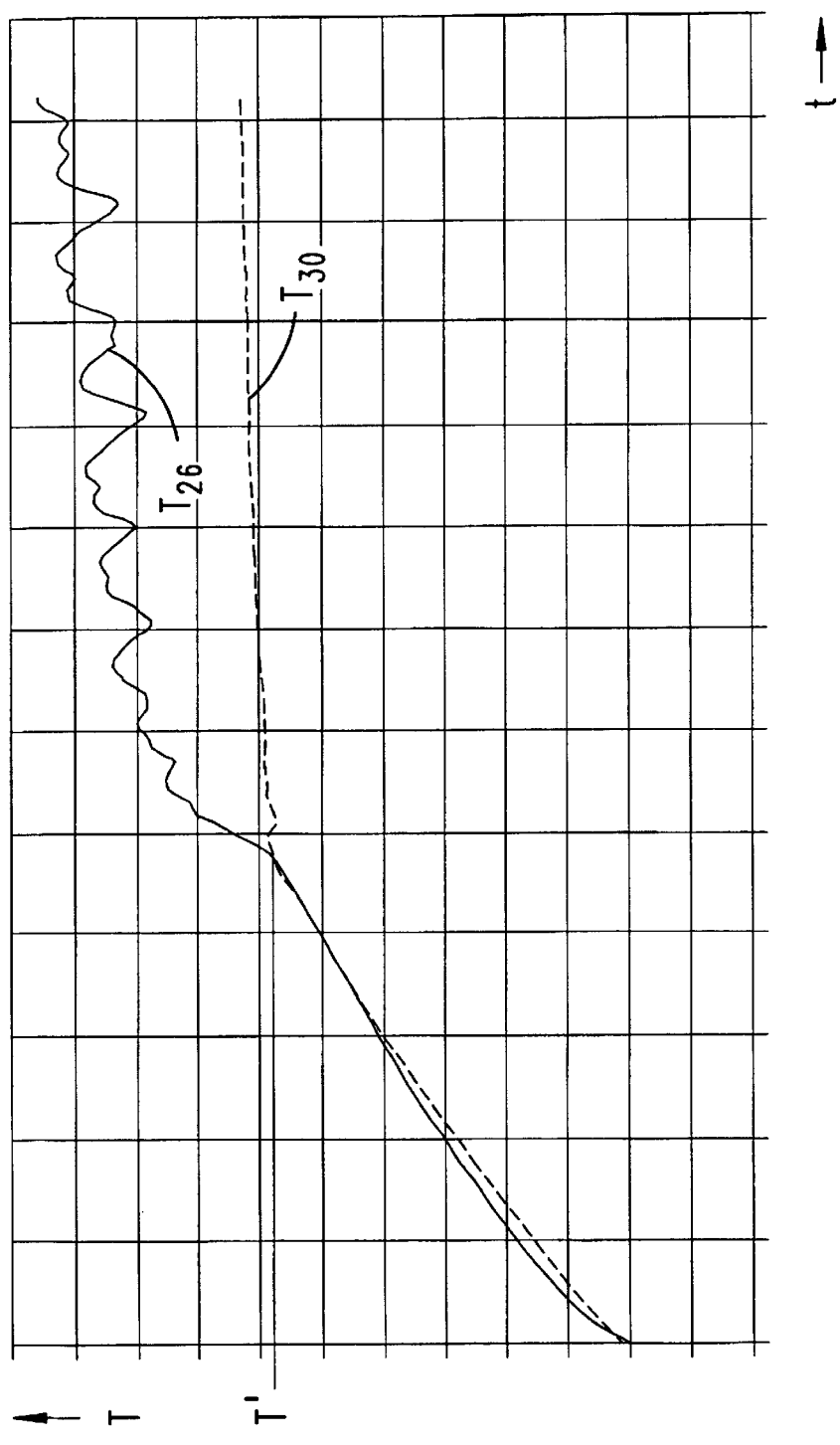
FIG. 5 shows a diagram to illustrate the rise in temperature of the food in relation to the temperature determined by a measuring sensor.

The diagram represented in FIG. 5 shows by the heating-up process for the preparation of a starch-containing medium 30, the rise in the temperature value measured by means of the measuring sensor 26 in the vicinity of the conductors 23. In this diagram, the rise over the time t in the temperature of the measuring sensor T26 in comparison with the temperature of the medium T30 as from a temperature level of about 78° C. (T') can be clearly seen. The uneven temperature progression of the measuring sensor curve T26 in the region above the temperature level T' is attributable to the heating element 10 being switched on and off to keep the temperature of the medium T30 approximately constant.

As a consequence of this, burning of critical foods caused by excessive temperatures at the contact area of the heating element 10 (medium-facing inner side of the mixing-vessel base 16) is counteracted. Such critical temperatures may occur if the heat transfer coefficient deteriorates significantly, which is often the case, for example, with foods which contain starch, which become pasty from temperatures of about 70° C. and, owing to a sharp increase in viscosity, lead to a reduction in the heat transfer coefficient. If the heating power is not reduced, this would then result in a drastic rise in temperature at the heating surface on the inner side of the mixing vessel 12.

As represented in FIGS. 6 and 7, in a further embodiment it is provided that, in the cylindrical region 20, forming the dome 24, of the mixing-vessel base 16, a further resistance heating element 10', if appropriate electrically connected to the resistance heating element 10 fitted on the underside of the mixing-vessel base 16, is likewise fitted such that it is disposed on the outer side. According to the first exemplary embodiment, this resistance heating element 10' is also formed as a thick-film heating element, with a stainless steel element which forms the dome 24 and on which an insulating layer in the form of a dielectric 22 is applied on the outer side of the mixing vessel. Applied on top of this by a screen printing process are also resistance conductors 23 consisting of ceramic pastes.

Furthermore, according to the representation of a detail in FIG. 8, in a further embodiment both the resistance heating element 10 on the underside of the mixing vessel and the resistance heating element 10' on the inner side of the dome may be formed as tubular heating elements, for which heating elements enveloped by a dielectric 31 and forming heat conductors 32 are provided.

In a further embodiment according to FIG. 9, disposed outside the mixing vessel 12, in association with its bottom region in the housing 8, and enclosing the mount 15, are microwave radiators 33. The latter are formed as quartz-glass radiators 34 which enclose the mount 15 in an annular form and operate in the medium wave range.

In the exemplary embodiment represented, four annular quartz-glass radiators 34, disposed one above the other, are provided, so that a broad heating element ring is formed around the bottom region of the mixing vessel 12.

The quartz-glass radiators 34 are at a spacing from the outer surface of the mixing vessel, this mixing-vessel outer surface 35 being provided at least in the bottom region of the mixing vessel 12 with a surface with active radiation absorption. For example, the surface may be formed as a black coating.

Furthermore, for heat protection from the appliance or from the housing 8, a cooling duct 36 surrounding the microwave radiators 33 and formed as an air duct with a through-flow is provided, it being possible for a cooling air flow to be generated for example by means of the drive 21 driving the agitator 11 in the mixing vessel 12.

The heating elements formed by the quartz-glass radiators 34 can be activated together, or else independently of one another, making optimized control of the heating formed in this way possible.

As a result of this embodiment of the solution according to the invention, contactless heating is provided for a mixing vessel 12.

We claim:

1. A food processor (1) with a mixing vessel (12) and a drive (21) for an agitator (11) in the mixing vessel (12), the mixing vessel (12) being heatable in its lower region and having on a bottom a dome (24) which has a securing mount for the agitator, wherein a resistance heating element (10) with printed conductors (23) applied to a dielectric (22) is fitted on a base (16) of the mixing vessel (12), said heating element (10) having a central recess (25) which is adapted to the dome (24), said heating element (10) being generally circular, disk-shaped.

2. The food processor as claimed in claim 1, wherein a resistance heating element (10) with printed conductors (32) enveloped by another dielectric (31) is fitted on the base of the mixing vessel (12).

3. The food processor as claimed in claim 2, wherein the printed conductors (23, 32) are secured on an outside of the base (16) of the mixing vessel (12) with the dielectric (22, 31) interposed.

4. The food processor as claimed in claim 1, wherein a measuring sensor (26) is provided, which while passing through a clearance (27) in the dielectric (22) rests against an outer side of the base (16).

5. The food processor as claimed in claim 1, wherein the dome (24) has a cylindrical region (20) and a resistance heating element (10') is formed in the cylindrical region (20) of the dome (24).

6. The food processor (1) as claimed in claim 1, wherein externally shielded microwave radiators (33) are disposed outside the mixing vessel (12), associated with a bottom region.

7. The food processor as claimed in claim 6, wherein the microwave radiators (33) comprise annular quartz-glass radiators (34).

8. The food processor as claimed in claim 7, wherein a plurality of separately activatable of said quartz-glass radiators (34) are provided.

9. The food processor as claimed in claim 6, wherein the mixing vessel (12) is provided on an outer side of its lower region with a surface with active radiation absorption.

10. The food processor as claimed in claim 9, wherein the surface is formed as a black coating.

11. The food processor as claimed in claim 6, wherein the microwave radiators (33) are surrounded by a cooling duct (36).

12. The food processor as claimed in claim 11, wherein the cooling duct (36) is formed as an air duct with a through-flow.

* * * * *